Aug. 24, 1943.                C. LOSE, JR                     2,327,726
                           FILTER BED CLEANING
                          Filed June 6, 1940           3 Sheets-Sheet 1

INVENTOR
CHARLES LOSE JR.
BY Louis L. Ansart
his ATTORNEY

Aug. 24, 1943.  C. LOSE, JR  2,327,726
FILTER BED CLEANING
Filed June 6, 1940  3 Sheets-Sheet 2

INVENTOR
CHARLES LOSE JR.
BY
his ATTORNEY

Patented Aug. 24, 1943

2,327,726

UNITED STATES PATENT OFFICE 2,327,726

FILTER BED CLEANING

Charles Lose, Jr., Cranford, N. J.

Application June 6, 1940, Serial No. 339,044

13 Claims. (Cl. 210—128)

This invention relates to filter bed cleaning as applied to filter beds of granular material such, for example, as sand, and more particularly to such cleaning by means of cleaners adapted to travel over the surfaces of said beds.

Cleaning of granular filter beds by cleaners traveling thereover has been carried out by many different forms of cleaners but such cleaners have, in general, been suited for operation in one direction only and would not give such satisfactory results if moved in the opposite direction. The desirability of having a cleaner which will operate equally well in opposite directions, arises more particularly in connection with the use of elongated filter beds which are relatively narrow but may be of considerable length.

An important object of the invention is to provide for the cleaning of granular filter beds in novel and advantageous manners. Another object of the invention is to provide novel and advantageous forms of traveling filter bed cleaners. Another object is to provide novel and advantageous forms of traveling filter bed cleaners adapted to work equally well when used in opposite directions. Another object is to provide novel and advantageous forms of traveling filter bed cleaners in which parts may be positioned suitably for use in the direction of motion selected and, when the direction is to be reversed, certain parts are shifted for the purpose of making the cleaner work in the same way as before. Another object of the invention is to provide a cleaner adapted to effect thorough cleaning, substantially from end to end, of a relatively narrow elongated bed. A further object of the invention is to provide a traveling cleaner with two separate sets of cleaning devices, and to use one set for removing and cleaning granular material from the lower part of the bed and the other for removing and cleaning granular material from the top of the bed.

According to an approved manner of carrying out the invention, use may be made of cleaning means such as disclosed in my copending application Ser. No. 329,026, filed April 11, 1940. In order that the cleaner of the present invention may be adapted for operation in opposite directions both traverse walls of the caisson, each of which serves as a front or rear wall depending upon the direction of the movement of the cleaner are provided at their lower edges with upwardly turned lips so as to ride over the filter bed material and, if necessary, press it down. It may also be desirable to provide two scrapers, each one to smooth the bed back of the caisson when traveling in the corresponding direction and for raising and lowering said scrapers with respect to said caisson so that the forward scraper will be at a higher level than the rear scraper which engages the surface of the bed.

Also, there are provided two sets of devices for lifting and cleaning the granular filter bed material. As disclosed in said copending application, each of such lifting and cleaning devices may comprise a substantially straight tubular member or tooth extending upwardly from the lower part of the bed to a level above the surface of the bed, a baffle at the lower end of said tooth to control the flow of material to the lower end of the hollow tooth and a deflector at the top of the tooth to turn downwardly the stream of material to cause the granular filter bed material, discharged from the upper end of the tooth to settle again on said filter bed. The teeth of the two sets are arranged to face in opposite directions so that with the cleaner moving in either direction the teeth of the rearward set will face in the direction of forward movement of said cleaner and the lower ends of the rearward set will be in the lower part of the filter bed.

At such times the teeth of the forward set will face rearwardly and will be in raised position, either with their lower ends in the upper part of the filter bed where they will assist in cleaning the surface material, or above the surface. In order to work in this way, the two sets of teeth may be separately supported and the raising and lowering of the sets may be provided for in such a manner that the action may be effected automatically.

Other objects, features and advantages will appear upon consideration of the following detailed description and of the drawings, in which.

Figure 1:
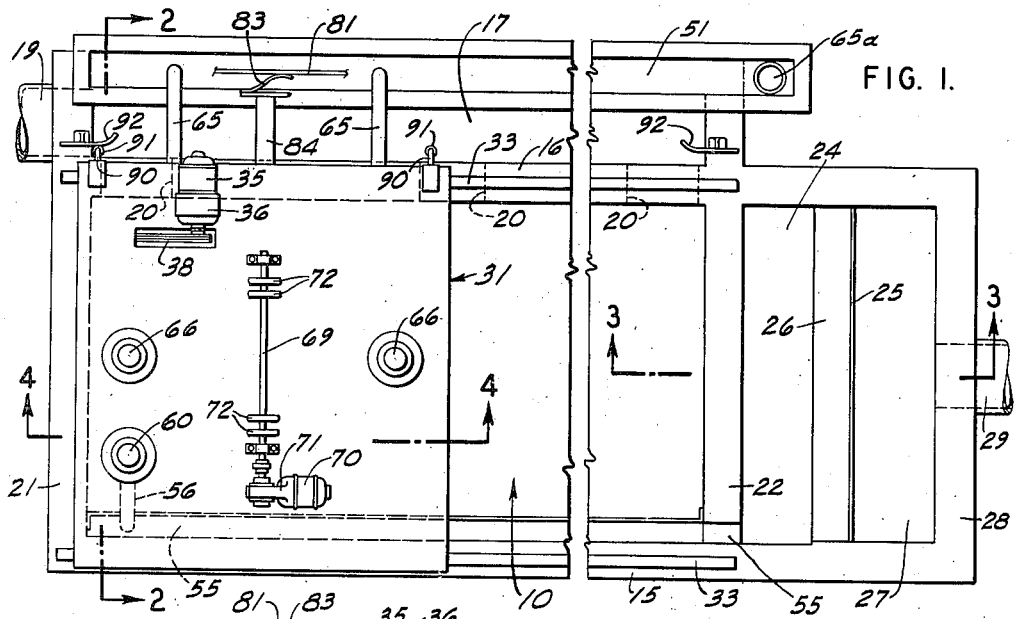
Fig. 1 is a fragmentary top plan view of apparatus illustrating one embodiment of the invention, the central part being broken away in order to show both ends.
Figure 2:
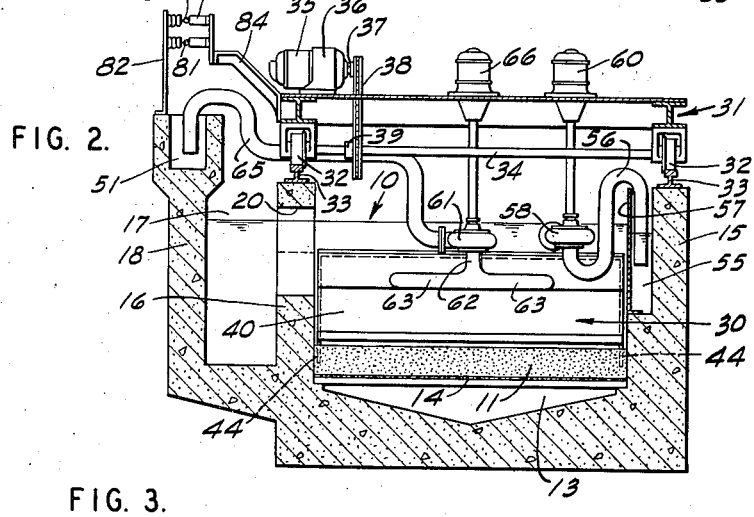
Fig. 2 is a section taken along the line 2—2 of Fig. 1.
Figure 3:
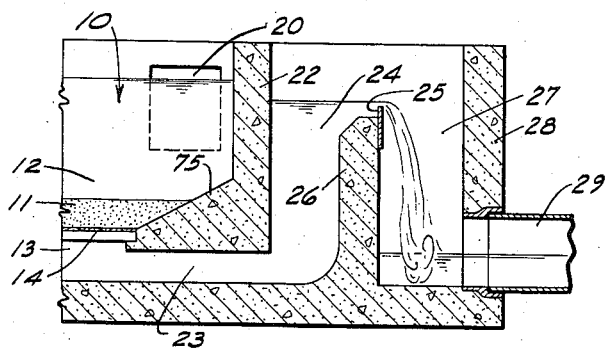
Fig. 3 is a section taken along the line 3—3 of Fig. 1.

Referring to the drawings, there is illustrated an embodiment of the invention in the form of apparatus for the filtration of solid bearing liquids such as sewage. The apparatus includes an elongated filter tank or channel 10 divided by a filter bed 11 into an upper influent portion 12 and a lower effluent portion 13 which receives the filtrate passing downwardly through the filter bed. The filter bed 11 which is of granular material, such as sand, may rest on a screen 14 supported in any suitable manner. The elongated filter channel has side walls 15 and 16 of which the wall 16 separates the filter channel from an influent channel 17. At its outer side the influent channel 17 has a side wall 18.

The influent channel 17 is supplied with influent liquid such as sewage through a duct 19 and the influent flows from the channel 17 into the tank 10 through one or more openings 20 in the wall 16. Preferably there are a number of inlet openings 20 arranged at intervals along the separating wall 16. The tank 10 has an end wall 21 which is extended to form the end wall of the influent channel 17, through which wall the duct 19 extends. At its other end the tank 10 is provided with an end wall 22 which is also extended to form a closed end wall of the influent channel 17. From the effluent channel 13 beneath the filter bed, the filtered effluent may flow through an outlet 23 at the bottom of wall 22 into a filtered effluent channel 24 and eventually may pass over a weir 25 at the top of a wall 26, fall into the chamber 27, between said wall 26 and an end wall 28 of the apparatus, and then be discharged from said chamber 27 through a duct 29, to any desired location. The height of the weir 25 assists in determining the height of liquid in the filter channel 10 required to force liquid downwardly through the filter bed 11. The filtrate is always in contact with the bottom surface of the filter bed which may be considered as immersed between the influent and the filtrate.

In order to keep the filter bed 11 in continuous operation, it is necessary to clean the granular material, such as sand, whenever the bed becomes contaminated or clogged to such a degree as to resist the passage of liquid and cause the liquid level to rise unduly in the filter channel 11. Heretofore such cleaning has been attained in many forms of filter channels or tanks by the use of filter bed cleaners traveling over the top of the filter bed and cleaning the sand or other granular material in various ways. However, the cleaners heretofore in use have been more effective while working in one direction only, and it has been found convenient in many cases to provide endless filter bed channels so that the filter bed cleaners could always travel in one direction.

In many instances, it is desirable to use an elongated and narrow filter bed such as illustrated in the drawings, and the filter bed cleaners which are adapted to work in one direction only are not particularly well adapted for cleaning a filter bed of the general shape referred to.

The present invention affords a solution of this problem, the cleaning of the filter bed being effected by means of a traveling cleaner 30 suspended from a truck 31 provided with wheels 32 arranged to rest on rails 33 on the tops of walls 15 and 16. Preferably corresponding wheels 32 are fixed on the opposite ends of axles 34 and at least one of these axles may be motor driven from a motor 35 mounted on the truck 31. The motor 35 acting through a speed reducer 36 may operate on a pulley 37 and through an endless flexible driving member 38, such as chain or belt, may actuate a pulley 39 on the driven axle 34 and drive the same. It will be evident that when the motor 35 is operated, the truck 31 will travel along the rails 33. Motor 35 may be reversed.

The cleaner 30 comprises a caisson or chamber 40 having an open bottom engaging the filter bed 11 at its upper surface. This caisson may correspond closely to caissons of certain prior filter bed cleaners. In view of the fact that the caisson is intended to travel in both directions, it is provided at both end walls 41 with members 42 which have upwardly turned lips 43 so that when one of these is at the head of the cleaner it will ride over and depress any granular material or waste solids projecting above the normal liquid level. Said lips 43 may be raised above the normal level of the upper surface of the bed to give a slight clearance. The cleaner also comprises side walls 44 which extend downwardly into the material of the filter bed 11.

As illustrated the sand or other granular material, within the limits of the caisson is cleaned by means including two transversely extending sets of teeth 45 of the type shown in said copending application Serial No. 329,026. As disclosed in said prior application each tooth 45 is hollow and has an internal passage which is substantially straight from bottom to top, and sand is taken from the bed, carried upwardly through the teeth for cleaning purposes, and turned downwardly above the top of the tooth by means of a deflector 46 whereby the sand may be directed downwardly to settle on the upper surface of the filter bed. The upward movement of the sand through each tooth may be effected by fluid such as water supplied under pressure to an upwardly turned jet 47 in the tooth. The means for supplying the fluid under pressure to the jet or nozzle 47 will be described hereinafter. Each of the teeth 45 is also supplied at its lower end with a rearwardly extending baffle 48. Inasmuch as, when the cleaner is moving in one direction, one set of teeth is to be down and the other up and these positions are reversed when the cleaner moves in the opposite direction, the baffles of the two sets extend in opposite directions.

When the cleaner is moved in one direction the teeth in the rearward set may be in their lowermost positions so as to draw up and clean the sand at the lower part of the bed. It should be understood that the baffles of these teeth extend to the rear. The other set of teeth is raised at this time and may be raised completely above the filter bed. Preferably, however, the lower ends of the teeth of the raised set extend into the upper part of the filter bed and tend to effect a cleaning action of the said at that level. It will be seen that the baffles of the raised teeth extend forwardly. In order to obtain the best results, the teeth in one set are staggered with respect to the teeth in the other set. The dirty or wash water containing the impurities collected from the cleaned sand or other granular material rises to the top of the caisson and flows through one or more openings 49 in the front and rear walls thereof into the upper parts of chambers 50 from which the dirty water or wash water is withdrawn and discharged, preferably into a channel 51 in the top of the wall 18. From the channel 51, the dirty water may be passed to any suitable location but preferably is returned to the incoming sewage. Obviously the chambers 50 might be located inside the caisson instead of outside as illustrated.

The fluid or liquid supplied to the jets 47 of each set of teeth 45 comes through a set of substantially vertical pipes or ducts 52 which are connected at their lower ends with the jets or nozzles 47 by any suitable means and are connected at their upper ends to a manifold 53 extending across the filter bed channel and guided for substantially vertical upward movement by substantially vertical guides 54 at the inner sides of the side walls 44 of the caisson 40 and extending into suitable grooves formed in the ends of the manifold. The pipes 52 depending from the manifold 53 may serve to support the corresponding teeth 45.

The liquid to be supplied to the two manifolds 53 may be drawn from a channel 55 receiving filtered liquid from the channel 24 and pass through a pipe 56 having one end projecting downwardly into the filtered water channel 55 and carried over the top of an inner wall 57 of this channel and then downwardly and upwardly to a pump 58 which forces the liquid through connections including flexible hose members 59 into the manifolds 53. Preferably the pump 58 may be suspended from the truck 31 and operated by a motor 60 through an impeller shaft (not shown).

Dirty water or wash water may be withdrawn from each of the chambers or compartments 50 by means of a pump 61 connected at its inlet with a duct 62 which in turn is connected by two branches 63 with a corresponding chamber 50 so as to draw the liquid from the chamber at two spaced locations. From the pump, liquid is discharged through a duct or pipe 65 into the channel 51 on top of the wall 18 and may be discharged from this channel 51 through an outlet 65a (Fig. 1). The pumps 61 are suspended from opposite ends of the truck or carriage 31 and are driven by corresponding motors 66 mounted on the truck.

Raising and lowering of the manifolds 53 and the sets of teeth 45 supported thereby, may be effected through links 67, two for each manifold 53 to which the lower ends of the links are pivoted near opposite ends thereof. Raising and lowering of the manifolds through the links 67 may be effected by means including eccentrics 68 mounted on a transverse shaft 69 supported on the truck 31 and operated back and forth through a range of 180° by means including a motor 70 and speed reducing means 71 interposed between the motor and the shaft 69. The eccentrics 68 are enclosed in straps 72 at the upper ends of the links 67, the eccentrics of the two sets being set 180° apart so that when one manifold is raised, the other is lowered. The links 67 may pass through suitable openings 73 in a plate 74 closing the top of the chamber 40.

Inasmuch as the cleaners cannot be worked effectively up close to the end walls 21 and 22 of the filter bed channel, the screen 14 supporting the filter bed 11 may not be carried to the end walls of the channel but to the lower edges of sloping portions 75 of the concrete or other structure extending upwardly from the ends of the screen to the vertical portions of the end wall (Fig. 1). Although the sand is not cleaned up to an incline 75 by the cleaner as it moves towards that end of the tank, it is cleaned to a much greater extent when the teeth 45 which were raised during such movement of the cleaner are lowered and the other set raised. After this shift the cleaning will take place comparatively close to the inclined portion 75.

Figures 4, 5:
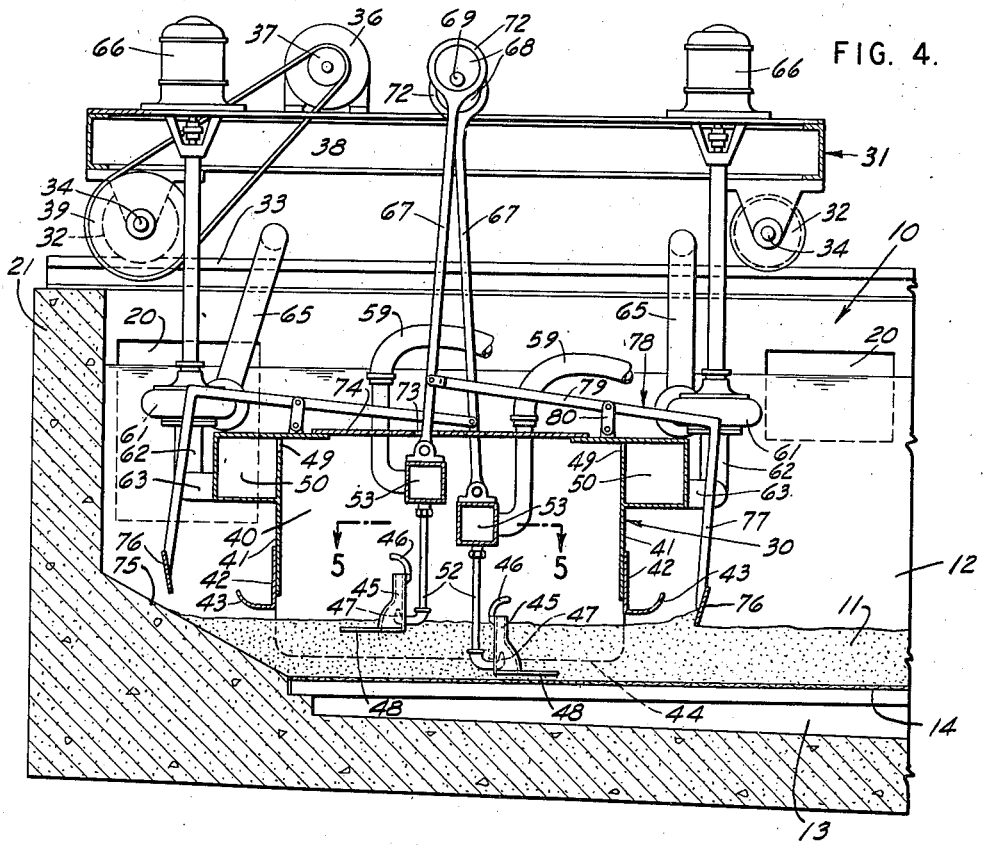
Fig. 4 is a section taken along the line 4—4 of Fig. 1.
Fig. 5 is a section taken along line 5—5 of Fig. 4.

In traveling in either direction, the teeth projecting downwardly from the cleaner tend to pile up the sand in front thereof and there should be some provision of means for smoothing down the sand during the movement of the cleaner away therefrom. To this end use may be made of devices or scrapers 76 such as shown in Figure 4. It is necessary, however, to have the forward scraper 76 raised and the rearward scraper 76 lowered as the cleaner moves along the channel. To obtain the desired result, each scraper 76 may be attached to the lower ends of downwardly extending arms 77 of bent levers 78 of which other arms 79 overlie the top of the caisson and are pivoted to the set of links 67 remote from the corresponding scraper 76. Intermediate the ends of each arm 79, such arm is pivoted to the upper end of a link 80 pivoted at its lower end to a suitable bracket on the top of the caisson.

Thus when the manifold at the forward side of the caisson is raised, the scraper 76 at the rear side of the cleaner will be lowered and will act to smooth out the material back of the cleaner. When the cleaner has reached one end of its path as indicated in Fig. 4, the forward scraper 76 will be in raised position and the rear scraper 76 will be in lowered position and has served to smooth out the sand left in irregular condition after the passage of the cleaner. When the positions of the manifolds are changed, the left hand scraper 76 will be lowered and will serve to move displaced material back over the screen supporting the filter bed.

It will be evident that movement of the caisson tends to build up a wave in the liquid particularly as the caisson approaches the end walls. Consequently there would be a tendency to produce surges of liquid back and forth between the caisson and the end walls. In order to avoid such surges the end openings 20 may be of greater size than the intermediate openings (Fig. 4).

All of the instrumentalities described can be controlled manually but preferably they are controlled electrically through a system which will now be described. For convenience parts which are thrown into use when the carriage is started to the right are marked R and corresponding parts in use in starting to the left are marked L and one-way movement may be marked by a single-headed arrow, while reversibility may be indicated by double ended arrows.

Electric power for operating the various motors and controlling certain switches may be taken from conductors 81 supported on brackets 82 but insulated therefrom, the brackets being supported on any suitable means such as the outer wall of the wash water channel 51. In contact with the two conductors 81 are spring contacts 83 carried on but insulated from a bracket 84 projecting from the truck 31. The springs 83 may be connected with suitable conductors 85 and 86 provided with a double switch 87 whereby a current through said conductors may be made or broken as described.

Figure 6:
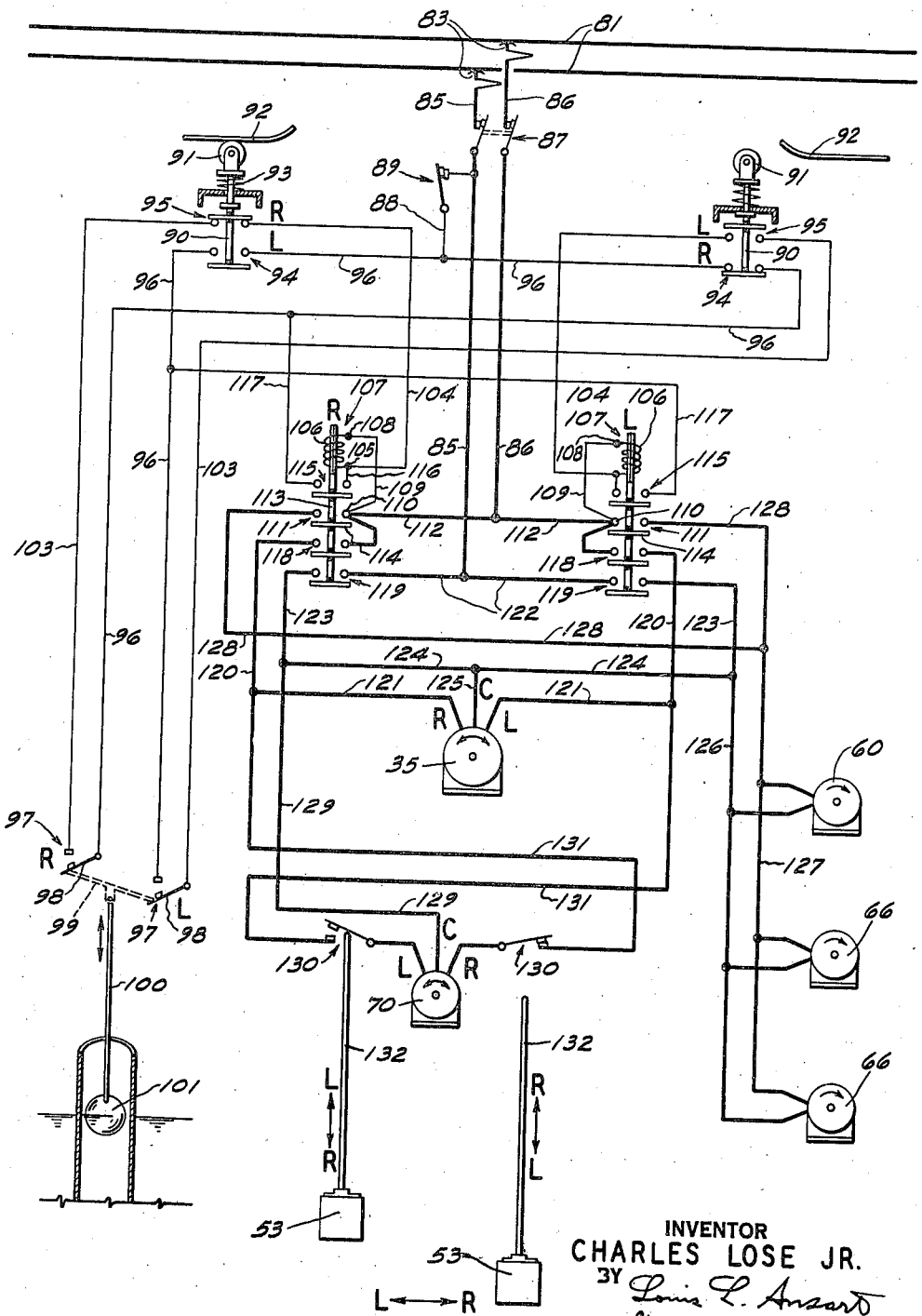
Fig. 6 is a diagrammatic view illustrating electrical means for automatic control of the filter bed cleaning means.

When the apparatus is entirely out of operation, switch 87 will be opened but during ordinary operation of the apparatus switch 87 will be kept closed. From conductor 85 inside the switch 87 there extends a branch 88 having therein a switch 89 which may be used to start and stop the apparatus when it is desired to control the action of the cleaner independently of an automatic control to be described hereinafter, as for example when an excessive flow of sewage keeps the level too high even in the event that the bed is relatively clean. As indicated in Fig. 6, the cleaner 30 is at the left end of the filter tank. Near the end of this movement a switch-controlling member 90, mounted on the truck, has been shifted by engagement of a roller 91 thereon with a fixed member or cam 92 (Fig. 5) at the left end of the filter channel and serving as a limit stop. Such shifting or forcing back of the member or rod 90 may be effected against the action of a spring 93 and serves to open a switch 94 and stop motor 35 and close a switch 95 to prepare for reversal of motor 35. At the opposite or right hand end of the tank is a second controlling member or cam 92 which, when the truck reaches the right hand end of the tank, acts on a roller 91 and forces back a rod 90 to open another switch 94 and closes another switch 95. When, however, the truck is at the left end of the tank the right hand switch 94 will be closed and the right hand switch 95 will be open.

In view of the fact that much of the electrical apparatus is duplicated, parts which are in duplicate will hereinafter be distinguished from each other, when necessary, by referring to them as left hand members or right hand members in accordance with their arrangement on Fig. 4.

The manually controlled switch 89 is normally closed, and when the liquid is at an excessive height above the filter bed, current may pass from the left hand or positive conductor 85 through branch 88 to a conductor 96, which is connected through the right hand closed switch 94 to a switch 97 of which the circuit closing member 98 is controlled by the height of water in the filter bed channel, being shifted to circuit closing position by rise of the water above a predetermined level. If the level in the filter bed channel rises too high due to the clogging of the filter bed, the contact making member 98 will be swung, by means to be described hereinafter, into a position to close switch 97. This switch 97 is one which may be effective when the truck is at the left hand end of the tank. There is also a corresponding right hand switch 97. Both of these switches are closed each time the level in the filter bed channel rises above a predetermined level. As illustrated, the two switch closing members 98 may be connected by a link 99 which is moved to open or close the switches by means of a link 100 pivoted thereto near the center thereof and connected with a float 101 which, as it rises and falls with the level of the liquid in the filter bed channel, closes and opens both switches 97.

From the left hand switch 97, the current passes through a conductor 103 to the left hand switch 95 which is closed at this time. The current then passes through a conductor 104 to a terminal 105 at one end of a coil 106 of a solenoid 107. From the conductor 104 the current passes through the coil 106 to the terminal 108 at the other end of the coil, and from there through a conductor 109 to a terminal or contact 110 of a switch 111 and from the terminal 110 through a conductor 112 to the negative conductor 86. The coil 106 being thus energized, shifts a member or rod 113 and closes not only switch 111 by shifting a member 113 but also closes a switch 115 connected at one side with coil terminal 105 by line 116 and at the other side, through a conductor 117, with the conductor 96, thus assuring energization of the solenoid even when current through conductor 104 is shut off by opening the left hand switch 95. The shifting of the member or rod 113 by energizing the solenoid 107 also closes a switch 118 and a switch 119. The closing of the switch 118, one terminal of which is connected with the terminal 110 of the switch 111 and the other terminal of which is connected through a conductor 120 and a conductor 121 with the driving motor 35 so that closing of the switches 118 and 119 causes current to flow from the positive conductor 85 through a conductor 122, closed switch 119, conductors 123, 124 and 125 to the motor 35 and from the motor through conductors 121, 120, closed switch 118 and conductor 112 to the negative conductor 86, thus starting the driving motor 35 in a direction to move the truck and the cleaner from the left end of the tank to the right end thereof.

Current supplied through the conductor 124 also passes to a conductor 126 which supplies power to the motor 60 for the jet pump 57 and to the motors 66 from the wash water pumps 61. From these motors the current passes through conductors 127 and 128, the closed switch 111 and conductor 112 to the negative line 86. Current from the positive conductor 85 passes through the conductor 122, closed switch 119 and conductor 123 as well as conductor 129 through the manifold raising and lowering motor 70 and from the motor through right hand closed switch 130 and conductor 131 to the line 120 and through the closed switch 118, terminal 110, and conductor 112 to the negative conductor 86.

Actuation of the motor 70 in this way acts to turn the shaft 69 through 180°, thereby lifting right hand manifold 53 and lowering left-hand manifold 53 (Fig. 4). Lifting of the right hand manifold tends to open right hand switch 130 and lowering of the left hand manifold tends to close left hand switch 130, the adjustments being such that the motor will move back and forth through a range of 180°. As indicated in Fig. 6, control of these switches may be effected by rods 132 projecting upwardly from the manifolds and adapted when a manifold 53 is raised to open the corresponding switch 130 and when lowered to permit the closing of such switch 130.

Actuation of the driving motor 35 to drive the cleaner and truck to the right causes wheel 91 to ride off the end of cam 92, thus permitting spring 93 to close switch 94 and open switch 95. This will break the circuit through conductor 104 and the solenoid coil 106 but due to the connection through switch 115 and conductor 117, the solenoid will remain energized. The breaking of the circuit through switch 95 will also prevent the passage of current through the corresponding switch 97 but will not affect the operation in any other way because the left hand switches 95 and 97 are of service only in starting the cleaner in its travel toward the right hand end of the tank. The closing of left hand switch 94 will have no effect at this time inasmuch as right hand switch is open at this time.

The cleaner will then be driven to the right hand end of the tank and during this action the jet pressure pump and the wash water pumps will be kept in operation. When the cleaner approaches the right hand end of the tank, the right hand wheel 91 will engage the fixed cam or limit stop 92 at the right hand end of the tank and right hand rod 90 will be forced back to open right hand switch 94 and close right hand switch 95. The electrical system will then be in such condition as to cause the cleaner to move to the left end of the tank while effecting cleaning of the filter bed. If, however, the filter bed has been sufficiently cleaned to permit the float 101 to sink far enough to open the switches 97, the starting circuit through which the right hand solenoid 107 is energized, cannot be closed and the apparatus will stop. If the switches 97 are closed at this time, the solenoid will be energized through the right hand switch 97 and the apparatus will work substantially as before except that the right hand solenoid 107 will be the one to be operated.

It will be evident that, by use of the rest of the system in exactly the same way as before but with different devices in use, the same operations will be carried out in the leftward movement or travel of the cleaner, as in the rightward movement of the cleaner.

It should be understood that various features may be changed and that certain features may be used without others, without departing from the true spirit and scope of the invention.

What I claim is:

1. A filter bed cleaner adapted for movement in either of two opposite directions over a filter bed of granular material immersed between the influent liquid and the filtrate, comprising a caisson having at its bottom an open mouth close to the surface of said bed, means carried by said cleaner for cleaning the material beneath the caisson during movement of the cleaner in either of said opposite directions, reversible means for driving said cleaner in said opposite directions, two scrapers carried by said cleaner at opposite ends of the caisson and spaced therefrom, the scraper at the front of the caisson in its movement in either direction being raised above the top of the filter bed and the scraper at the rear being in lowered position to smooth the bed behind the caisson and means controlled by said reversible means when it reverses to lower the raised scraper to effective position and to raise the lowered scraper to ineffective position.

2. A filter bed cleaner adapted for movement in either of two opposite directions over a filter bed of granular material immersed between the influent liquid and the filtrate, comprising a caisson having at its bottom an open mouth close to the surface of said bed, means carried by said cleaner for cleaning the material beneath the caisson during movement of the cleaner in either direction, two scrapers carried by said cleaner at opposite ends of the caisson and spaced therefrom, the scraper at the front of the caisson in its movement in either direction being raised above the top of the filter bed and the scraper at the rear being in lowered position to engage the bed behind the caisson, reversible means for driving said cleaner in opposite directions, means controlled by said reversible means for changing the operation of such cleaning means in accordance with the direction of movement of the cleaner, and means controlled by said reversible means when it reverses to lower the raised scraper to effective position and to raise the lowered scraper to ineffective position.

3. A filter bed cleaner adapted for travel over a filter bed of granular material immersed between the influent liquid and the filtrate, comprising a caisson having an open bottom close to said bed and cleaning means carried by said cleaner to clean the material beneath said caisson, said cleaning means including two rows of hollow teeth arranged transversely of the path of travel of the cleaner and means for passing granular material from the filter bed upwardly through said teeth and discharging it in said caisson above the upper surface of the bed, means for supporting the teeth of the forward row in position with their lower ends in the upper part of the bed and for supporting the teeth of the rearward row with their lower ends in the lower part of the bed.

4. A filter bed cleaner adapted for travel over a filter bed of granular material immersed between the influent liquid and the filtrate, comprising a caisson having an open bottom close to said bed and cleaning means carried by said cleaner to clean the material beneath said caisson, said cleaning means including two rows of hollow teeth arranged transversely of the path of travel of the cleaner, means for passing granular material from the filter bed upwardly through said teeth and discharging it in said caisson above the upper surface of the bed, means for supporting the teeth of the forward row in position with their lower ends in the upper part of the bed and means for supporting the teeth of the rearward row with the lower ends of the teeth in the lower part of the bed, and means for lowering the raised teeth and raising the lowered teeth to enable like operation of the cleaner in the opposite direction.

5. A filter bed cleaner adapted for travel over a filter bed of granular material immersed between the influent liquid and the filtrate, comprising a caisson having an open bottom close to said bed and cleaning means carried by said cleaner to clean the material beneath said caisson, said cleaning means including two rows of hollow teeth arranged transversely of the path of travel of the cleaner and having at the lower ends of the teeth baffles extending in opposite directions so that the baffles of the lowered set will extend rearwardly and those of the raised set forwardly, means for passing granular material from the filter bed upwardly through said teeth and discharging it in said caisson above the upper surface of the bed, means for supporting the teeth of the forward row with their lower ends in the upper part of the bed and means for supporting the teeth of the rearward row with their lower ends in part of the bed, and means for lowering the raised teeth and raising the lowered teeth to enable like operation of the cleaner in the opposite direction.

6. A filter bed cleaner adapted for travel over a filter bed of granular material immersed between the influent liquid and the filtrate, comprising a caisson having an open bottom close to said bed and cleaning means carried by said cleaner to clean the material beneath said caisson, said cleaning means including two rows of hollow teeth arranged transversely of the path of travel of the cleaner, upwardly turned nozzles in the lower parts of said teeth, the teeth of the forward row being in an elevated position to take granular material from the upper part of the filter bed and the teeth of the rearward row being in a lower position, two pressure-manifolds from which the teeth are supported having ends slidably mounted at the inside of the caisson, pipes extending to each of said nozzles from the corresponding manifold, and means for raising and lowering the manifolds to raise and lower the corresponding sets of teeth to enable like operation in the opposite direction.

7. A filter bed cleaner adapted for travel over a filter bed of granular material immersed between the influent liquid and the filtrate, comprising a caisson having an open bottom close to said bed and means for cleaning the surface layer of the bed beneath the caisson including a set of hollow teeth arranged transversely of the path of movement of the cleaner and having their lower ends projecting into the upper part of said bed, means projecting forwardly from the lower ends of said teeth to loosen the material in the layer to be cleaned, means for cleaning the surface material by passing it up through said teeth and discharging it above said bed and means for discharging dirty liquid from said caisson.

8. In filtration apparatus, the combination of a filter tank containing a filter bed supported by a screen, and a reciprocable cleaner comprising a reciprocable caisson with an open bottom above said bed and hollow teeth extending downwardly from the caisson into said bed and spaced inwardly from the front and rear of the caisson, said filter tank having end walls with lower portions inclined upwardly and outwardly from the ends of said screen to enable the ends of the caisson to pass beyond the ends of the screen to enable the hollow teeth to move to substantially the ends of the screen.

9. In filtration apparatus, the combination of an elongated tank having in its lower part a granular filter bed immersed between the influent and the filtrate, the end walls of the tank having inwardly and downwardly inclined portions at the level of the filter bed and somewhat above the same to render the effective length of the filter bed less than that of the tank to enable cleaning of the bottom of the filter bed substantially from end to end of said bottom, a filter bed cleaner movable back and forth over said bed from end to end of the tank, scrapers at the front and the rear of said cleaner connected with the cleaner and spaced from the ends thereof, and means controlled by the direction of movement of the cleaner to hold the following scraper in lowered position to draw back material piled up on the corresponding inclined portion and level the bed beyond the cleaner and to hold the leading scraper raised until the cleaner reaches the end of its path and then to raise the lowered scraper and the raised scraper to carry any accumulation of waste material on the adjacent inclined portion to a point where the waste material will be taken up by the cleaner and to level the filter bed back of said cleaner.

10. The combination with an elongated tank having at the bottom thereof a granular filter bed immersed between the influent and the filtrate, and in usual tank a filter bed cleaner traveling from end to end of said tank would tend to build up a wave as it approaches the ends of the tank, of means for supplying influent to said tank including an influent channel at one side of the tank separated therefrom by a side wall of the tank and connected with the interior of the tank by a plurality of openings through said wall, the openings at the tank ends being larger than the others to enable liquid in any piled up wave to pass freely into the influent channel, thus avoiding surges of the liquid.

11. In apparatus for cleaning a granular filter bed at the bottom of an elongated tank, a cleaner movable from end to end of said tank and comprising an open-bottom caisson movable over the surface of said bed, two sets of hollow cleaning teeth extending transversely of the tank and projecting downwardly from said caisson into said granular bed, means for cleaning said granular material by passing it upwardly through said teeth and discharging it on the upper surface of said bed, said teeth being arranged in one way for movement of the cleaner in one direction with the leading set up and the trailing set down and vice versa for movement in the opposite direction, means for starting the cleaner at either end of the tank when the liquid over the filter bed is higher than a predetermined level and stopping the cleaner at either end of the tank if the liquid over the filter bed is below the predetermined level, and means rendered effective when the cleaner changes direction at the end of the tank to change the arrangement of said teeth accordingly.

12. In apparatus for cleaning a granular filter bed at the bottom of an elongated tank, a filter bed cleaner movable from end to end of said tank and comprising an open-bottomed caisson movable over the surface of said bed, two sets of hollow teeth arranged transversely of the tank and projecting downwardly from the interior of the caisson, means for moving one set of said teeth upwardly to position the lower ends of the teeth in the upper part of the bed for movement of the cleaner with this set in leading position, and the other set downwardly for trailing movement, to position the lower ends in the lower parts of the bed, means for passing granular material from the bed upwardly through said teeth and discharging it on the surface of the bed in cleaned condition, means for discharging dirty water from said caisson, means for driving the cleaner from end to end of the tank in either direction, and then stopping, and float-controlled means effective when the liquid level is above a predetermined level to start the caisson from its position at one end of the tank toward the other end, to shift the sets of hollow teeth by raising the forward set and lowering the rearward set, to start the cleaning of granular material by passing it upwardly through said teeth, and to start removal of dirty liquid from said caisson.

13. In apparatus for cleaning a granular filter bed at the bottom of an elongated tank, a cleaner movable from end to end of the tank and comprising an open-bottomed caisson with its bottom close to the bed, two fluid pressure manifolds in said caisson extending transversely of the tank and connected for upward and downward movement in opposite directions, a row of hollow teeth projecting downwardly from each of said manifolds, an upwardly directed nozzle in each of said teeth, a connection to each of said nozzles from the corresponding manifold, means including a motor for operating the connection between said manifolds to effect simultaneous lowering of one of said manifolds for trailing movement and lifting of the other for leading movement, a reversible motor for operating said cleaner in opposite directions, motor operated pumping means for discharging dirty water from the caisson, electrical means for controlling the operation of said motor operated means including starting circuits each controlled by two switches, one closed only when the carriage is on one end of its path and the other closed only when the liquid level over the filter bed is too high, two operating circuits each closed by the corresponding starting circuits when the carriage is at the proper end of the tank and opened by movement to the other end of the tank, branch circuits for operating the pressure pump motor and the discharge pump motors irrespective of the direction of the cleaner movement, and means rendered effective by movement of a manifold to a limiting position for shutting off the manifold shifting motor.

CHARLES LOSE, JR.